US012743483B2

(12) United States Patent
Klein et al.

(10) Patent No.: US 12,743,483 B2
(45) Date of Patent: Sep. 22, 2026

(54) DROP-LAYER BASED VECTOR AUGMENTATION

(71) Applicant: SAP SE, Walldorf (DE)

(72) Inventors: Tassilo Klein, Berlin (DE); Moin Nabi, Berlin (DE)

(73) Assignee: SAP SE, Walldorf (DE)

( * ) Notice: Subject to any disclaimer, the term of this patent is extended or adjusted under 35 U.S.C. 154(b) by 925 days.

(21) Appl. No.: 18/067,116

(22) Filed: Dec. 16, 2022

(65) Prior Publication Data

US 2024/0202281 A1 Jun. 20, 2024

(51) Int. Cl.
*G06F 18/214* (2023.01)
*G06F 18/2411* (2023.01)

(52) U.S. Cl.
CPC ........ *G06F 18/214* (2023.01); *G06F 18/2411* (2023.01)

(58) Field of Classification Search
CPC ..... G06F 18/214; G06F 18/2411; G06F 16/35
See application file for complete search history.

(56) References Cited

U.S. PATENT DOCUMENTS 10,565,498 B1 * 2/2020 Zhiyanov ............ G06N 3/0985
2008/0221878 A1 * 9/2008 Collobert ............... G06F 40/30 704/232
2017/0329863 A1 * 11/2017 Metz ..................... G06F 40/134
2018/0365593 A1 * 12/2018 Galitsky ............. G06F 16/2246
2019/0057068 A1 * 2/2019 Diamond .............. G06F 40/197
2019/0188263 A1 * 6/2019 Ock ..................... G06N 3/0499
2021/0141995 A1 * 5/2021 Lundgaard ............. G06V 10/40
2022/0164600 A1 * 5/2022 Cheng .................. G06N 3/0499
2024/0193484 A1 * 6/2024 Misawa ................. G06N 5/025

FOREIGN PATENT DOCUMENTS

CN 111709223 A * 9/2019 ............ G06F 16/35

OTHER PUBLICATIONS

Carlsson, F. et al., "Semantic Re-Tuning with Contrastive Tension," (2020) In International Conference on Learning Representations.

(Continued)

*Primary Examiner* — Phenuel S Salomon
(74) *Attorney, Agent, or Firm* — Mintz Levin Cohn Ferris Glovsky and Popeo, P.C.

(57) ABSTRACT

A method comprises generating vectors of sentences, the sentences including text, performing an augmentation operation on a first vector of the vectors and a second vector of the vectors, the augmentation operation comprising: merging the first vector with the second vector such that at least a first element of the first vector is combined with a second element of the second vector, wherein the first element is representative of a first sentence of the plurality of sentences and the second element represents a second sentence of the plurality of sentences, inputting, the first vector that is merged with the second vector, into a first layer, and generating a third vector that is based on the first vector that is merged with the second vector, the third vector including a third element that represents the first sentence and the second sentence.

20 Claims, 8 Drawing Sheets

500

Generate vectors comprising a plurality of elements representative of a plurality of sentences, the plurality of sentences including text that is included as part of training data
502

Perform an augmentation operation on a first vector of the vectors and a second vector of the vectors, the augmentation operation comprising: merging, in accordance with a weighting factor, the first vector with the second vector such that at least a first element of the first vector is combined with a second element of the second vector, wherein the first element is representative of a first sentence of the plurality of sentences and the second element represents a second sentence of the plurality of sentences
504

Input, the first vector that is merged with the second vector, into a first layer
506 generate, using the first layer, a third vector that is based on the first vector that is merged with the second vector, the third vector including a third element that represents the first sentence and the second sentence
508

(56) References Cited

OTHER PUBLICATIONS

Chen, T. et al., "A Simple Framework for Contrastive Learning of Visual Representations," (2020) In International conference on machine learning, pp. 1597-1607. PMLR.
Chen, X. et al., "Improved baselines with momentum contrastive learning," 2020, arXiv preprint arXiv:2003.04297.
Devlin, J. et al., "BERT: Pre-training of Deep Bidirectional Transformers for Language Understanding," arXiv preprint (2018): arXiv:1810.04805.
Devlin, J. et al., BERT: Pre-training of Deep Bidirectional Transformers for Language Understanding, (2019): pp. 4171-4186.
Fang, H. et al., "CERT: Contrastive self-supervised learning for language understanding," 2020, arXiv preprint arXiv:2005.12766.
Gao, T. et al., "SimCSE: Simple Contrastive Learning of Sentence Embeddings," (2021) In Proceedings of the 2021 Conference on Empirical Methods in Natural Language Processing, pp. 6894-6910.
Giorgi, J. et al., DeCLUTR: Deep Contrastive Learning for Unsupervised Textual Representations, (2021) In Proceedings of the 59th Annual Meeting of the Association for Computational Linguistics and the 11th International Joint Conference on Natural Language Processing (vol. 1: Long Papers), pp. 879-895.
He, K. et al., "Momentum Contrast for Unsupervised Visual Representation Learning," (2020) In Proceedings of the IEEE/CVF Conference on Computer Vision and Pattern Recognition (CVPR), pp. 9729-9738.
Klein, T. et al., "Contrastive Self-Supervised Learning For Commonsense Reasoning," (2020) arXiv preprint arXiv:2005.00669.
Liu, Y. et al., "RoBERTa: A robustly optimized bert pretraining approach," 2019, arXiv preprint arXiv: 1907.11692.
Mikolov, T. et al., "Efficient estimation of word representations in vector space," 2013, arXiv preprint arXiv: 1301.3781.
Peters, M.E. et al., "Deep contextualized word representations," 2018, arXiv preprint arXiv: 1802.05365.
Wu, Z. et al., "CLEAR: Contrastive learning for sentence representation," 2020, arXiv preprint arXiv:2012.15466.
Zhang, Y. et al., "An Unsupervised Sentence Embedding Method by Mutual Information Maximization," pp. 1601-1610.

* cited by examiner

DROP-LAYER BASED VECTOR AUGMENTATION

TECHNICAL FIELD

The subject matter described herein generally relates to drop-layer based training of machine learning models.

BACKGROUND

Training machine learning models based on contrastive representation learning is useful in various applications such as machine translation, sentiment analysis, data retrieval, semantic search and similarity determination, and so forth. Contrastive representation learning operates to enable the learning of embeddings or vector spaces that comprise positive pairs and negative pairs in particular ways for the purpose of determining various characteristics of sentences, images, audio data, video data, and so forth, e.g., meaning, context, sentiment, color, texture, object characteristics, and so forth. However, negative pairs are challenging to generate, require customized mining strategies, a large dataset, and are memory and resource intensive.

SUMMARY

Systems, methods, and articles of manufacture, including computer program products, are provided for training a machine learning model using self-contrastive decorrelation. In one aspect, there is provided a computer-implemented method comprising: generating vectors comprising a plurality of elements representative of a plurality of sentences, the plurality of sentences including text that is included as part of training data, performing an augmentation operation on a first vector of the vectors and a second vector of the vectors, the augmentation operation comprising: merging, in accordance with a weighting factor, the first vector with the second vector such that at least a first element of the first vector is combined with a second element of the second vector, wherein the first element is representative of a first sentence of the plurality of sentences and the second element represents a second sentence of the plurality of sentences, inputting, the first vector that is merged with the second vector, into a first layer, and generating, using the first layer, a third vector that is based on the first vector that is merged with the second vector, the third vector including a third element that represents the first sentence and the second sentence.

In some variations, one or more of the features disclosed herein including the following features can optionally be included in any feasible combination. The merging of the first vector with the second vector includes concatenating the first element representative of the first sentence with the second element representative of the second sentence.

In some variations, the first element comprises a first plurality of numbers representative of one or more letters of the first sentence and the second element comprises a second plurality of numbers representative of one or more letters of the second sentence.

In some variations, the third element includes a third plurality of numbers that comprises the first plurality of numbers and the second plurality of numbers.

In some variations, the weighting factor is randomly determined.

In some variations, the weighting factor has a value in a range between 0 and 1.

In some variations, the method further comprises generating additional vectors comprising a plurality of additional elements representative of a plurality of images included as part of the training data, performing an additional augmentation operation on a fourth vector of the additional vectors and a fifth vector of the additional vectors, the augmentation operation comprising: merging, in accordance with an additional weighting factor, the fourth vector with the fifth vector such that a fourth element of the fourth vector is combined with a fifth element of the fifth vector, wherein the fourth element represents a first characteristic of an image of the plurality of images and the fifth element represents a second characteristic of an additional image, inputting, the fourth vector that is merged with the fifth vector, into a second layer, and generating, using the second layer, a sixth vector that is based on the fourth vector that is merged with the fifth vector, the sixth vector including a sixth element that represents the first characteristic of the image and the second characteristic of the additional image.

In some variations, the first characteristic corresponds to a color of the image and the second characteristic corresponds to an additional color in the additional image, and wherein the fourth element comprises numbers representing the color and the fifth element comprises additional numbers representing the additional color.

In some variations, the sixth element includes the first characteristic and the second characteristic, the sixth element comprises the numbers representing the color and the additional numbers representing the additional color.

In another aspect, there is provided a system that comprises at least one data processor, and at least one memory storing instructions, which when executed by the at least one data processor, cause operations comprising: generating vectors comprising a plurality of elements representative of a plurality of sentences, the plurality of sentences including text that is included as part of training data, performing an augmentation operation on a first vector of the vectors and a second vector of the vectors, the augmentation operation comprising: merging, in accordance with a weighting factor, the first vector with the second vector such that at least a first element of the first vector is combined with a second element of the second vector, wherein the first element is representative of a first sentence of the plurality of sentences and the second element represents a second sentence of the plurality of sentences, inputting, the first vector that is merged with the second vector, into a first layer, and generating, using the first layer, a third vector that is based on the first vector that is merged with the second vector, the third vector including a third element that represents the first sentence and the second sentence.

In yet another aspect, at least one non-transitory computer readable media storing instructions that, when executed by at least one processor, cause the at least one processor to perform operations comprising: generating vectors comprising a plurality of elements representative of a plurality of sentences, the plurality of sentences including text that is included as part of training data, performing an augmentation operation on a first vector of the vectors and a second vector of the vectors, the augmentation operation comprising: merging, in accordance with a weighting factor, the first vector with the second vector such that at least a first element of the first vector is combined with a second element of the second vector, wherein the first element is representative of a first sentence of the plurality of sentences and the second element represents a second sentence of the plurality of sentences, inputting, the first vector that is merged with the second vector, into a first layer, and generating, using the first layer, a third vector that is based on the first vector that is merged with the second vector, the third vector including a third element that represents the first sentence and the second sentence.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the generation of a user interface for accessing one or more software applications, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations.

In the drawings.

DETAILED DESCRIPTION

Figure 1:
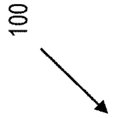
FIG. 1 depicts an example architecture, in accordance with some embodiments.
Figure 1:
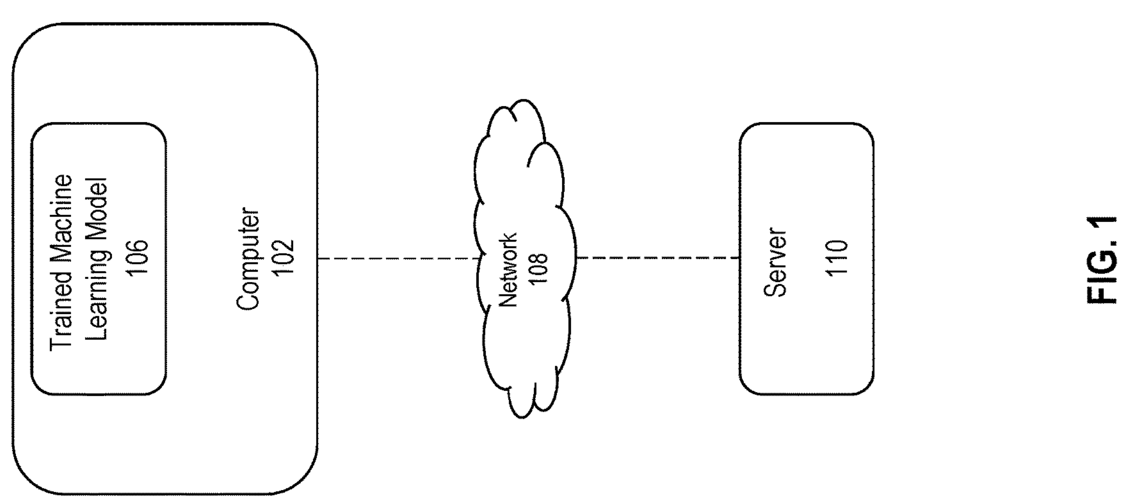

As stated above, various machine learning models undergo unsupervised training with the use of contrastive representations. Broadly speaking, contrastive representations may correspond to a machine learning ("ML") model training technique that involves training data that includes a combination of a plurality of positive pairs (sentences or phrases having a similar meaning) and negative pairs (sentences or phrases having a dissimilar or meaning). The use of such training data exposes the model to a wide spectrum of possible contexts, meanings, sentiments, and so forth, for various sentences. However, generating negative pairs are challenging, memory intensive, and involve the use of a large dataset and customized mining strategies.

A drop-layer based vector augmentation technique for training a machine learning model, as described herein, addresses and overcomes the above described deficiencies. The drop-layer based vector augmentation technique described here enables the training of machine learning models such that these models operate to perform sentence sentiment analysis, sentence similarity analysis, semantic search, and so forth, at a level of accuracy that matches or exceeds various conventional techniques, but without involving the generation of explicit negative pairs. Instead, the drop-layer based vector augmentation technique trains the model to determine embeddings (e.g., vector representations) in order to perform sentence sentiment analysis, sentence similarity analysis, semantic search, and so forth, by combining elements (vector elements) representative of different sentences in the vector space. It is noted that while the vector augmentation occurs in the vector space, the inputs are not modified prior to or after the implementation of the vector augmentation technique. Further, it is noted that prior to generating vectors corresponding to different sentences, each of the sentences are partitioned (e.g., tokenized) such that each sentence may comprise a combination of one or words or phrases. Each partition or token may correspond to a combination of one or more words or phrases, and respective vectors may be generated for each partition or token.

For example, a model may be trained on training data that comprises text. In aspects, at least a subset of the text representing a subset of sentences in the training data may be converted to tokens. Thereafter, vectors with various elements may be generated for each of these tokens. The vectors comprise numerous elements, with each element characterizing various aspects of the text, e.g., letters, words, punctuations, and so forth. Thereafter, a first vector representing at least a part of a sentence may be combined with a second vector representing at least another part of the sentence such that the combined or newly generated vector may include the elements from both the first and second vectors. It is noted that the combination of the first and second vectors may result in a third vector including numbers representing all the letters, punctuations, and so forth, of the first and second vectors, namely the elements of the first and second vectors. For example, if the first vector represents a sentence such as "Cats lay on couches." and the second vector represents a different sentence such as "Dogs love to play in the yard.", the third vector may include elements or numbers representative of a combination of these two sentences—"Cats lay on couches. Dogs love to play in the yard." It is noted that the training data set that includes the sentences "Cats lay on couches." and "Dogs love to play in the yard." are not modified. Instead, the combination or augmentation of vector elements occurs in the vector space.

In another aspect, the training data may include image data. Elements included as part of vectors are representative of colors, textures, and other comparable details of a first image may be combined with elements included as part of vectors representative of colors, textures, and other comparable details of a second image. Additionally, elements included as part of vectors representative of objects in the first image may be combined with elements included as part of vectors representative of objects included in the second image. For example, an image of a cat on a couch may be combined with an image of a dog in the yard, and specifically, elements of colors of the image of the cat may be combined with elements of colors of the image of the dog (e.g., in a first machine learning layer). Thereafter, elements representing a position and/or orientation of the cat and the couch may be combined or fused with the position and/or orientation of the dog in the yard.

As a result of being trained on such data, the trained machine learning model may be able to accurately identify a vast number of permutations and combinations of sentences and objects within the images in various positions, orientations, and so forth. For example, in response to a query, the trained machine learning model may be able to identify images of dogs laying on couches and cats playing the yard, in addition to identifying sentences that are semantically similar to various permutations and combinations of the sentences of "Cats lay on couches." and "Dogs love to play in the yard" such as, e.g., Cats love to play in the yard, Dogs lay on couches, and so forth. It is noted that the trained machine learning model operates in a generalized manner such that the model is able to identify these varied permutations and combinations despite the fact that the training data may not have these permutations and combinations of sentences and images.

FIG. 1 depicts an example architecture 100 that is used to execute implementations of the present disclosure. In the depicted example, a machine learning model that is trained using a drop-layer based vector augmentation technique as described herein, namely a trained machine learning model 106, may be operable on a computer 102, which is communicatively coupled to a server 110, for example, via a network 108. In aspects, the communication between the computer 102 and the server 110 may occur wirelessly or via a wired connection. In aspects, the trained machine learning model 106 may operate as part of one or more software applications for the purpose of performing various tasks such as textual semantic analysis, sentiment analysis, image analysis and recognition, audio and video analysis and recognition, and so forth.

In aspects, the training of the trained machine learning model 106 utilizes a drop-out layer based technique to modify the elements of vectors in order to generate varied versions of training data on. For example, a sample training dataset may include multiple sentences comprising a plurality of text, punctuation, and so forth, as stated above. As part of the training of a model, vector representations or vectors characterizing the plurality of sentences may be generated, with each vector including one or more elements or numbers representative of one or more letters in these sentences. Thereafter, the drop-out layer based technique may be utilized to generate different versions of the vectors representative of the sample training data set. For example, the training dataset may include a sentence such as "I have a black phone," and the drop-layer based technique may be utilized to generate different versions of a vector characterizing the sentence of "I have a black phone." In particular, elements (e.g., numbers) representative of the one or more of the letters or words of the sentence may be modified or eliminated during the training process such that the model may be trained on vectors corresponding to "I have a phone", "I do not have a phone", "Have a phone", and so forth. It is noted that the drop-layer based technique modifies vectors of sentences in the training data, but the content of the training data is not modified. In other words, the drop-layer based technique operates in the vector or embedding space without altering the subject matter of the training data. In other words, the drop-layer based technique does not operate in input space.

Additionally, as part of the training process, a vector (which is associated with a particular machine learning ("ML") layer), may be combined with another vector (associated with another ML layer) in order to train the model on variations of sentences included in the training data. For example, a vector representative of the sentence of "Cats sit on couches" may be combined with another vector representative of the sentence of "Dogs play regularly in yards", in the vector or embedding space, such that the combined vector may be representative of the subject matter of both sentences, e.g., "Cats sit on couches and Dogs play in yards". While the two sentences may not be grammatically logical or accurate, the model being trained on both sentences enables the trained machine learning model 106 to more accurately identify search results (based on query) that has a sentence such as "Dogs sits on couches" and "Cats play in yards", in particular, without requiring the training dataset to include these sentences. In this way, models may be trained to more accurately identify a large range of sentences based on a relatively smaller training dataset. Further, as described in greater detail later on in this disclosure, such a technique may also be implemented on training datasets that include audio data, video data, and so forth.

Figure 2A:
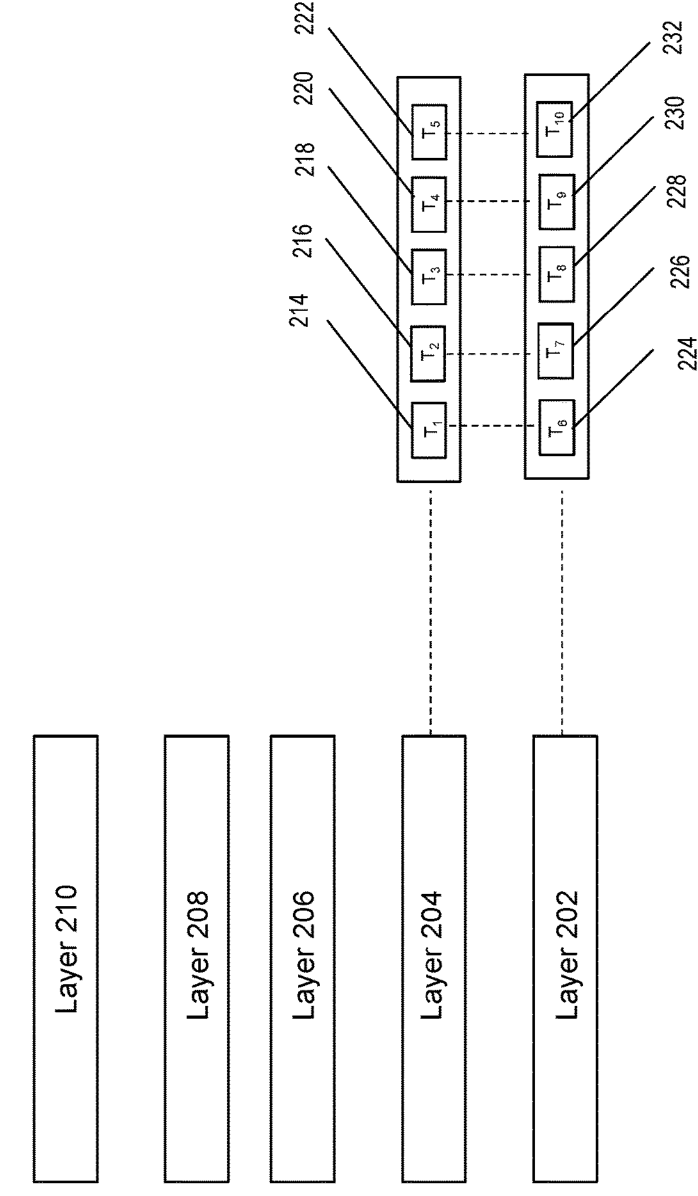
FIG. 2A depicts a plurality of layers and vectors utilized for training of a machine learning model, in accordance with some embodiments.

FIG. 2A depicts a plurality of layers and vectors utilized for training of a machine learning model, in accordance with some embodiments. FIG. 2A depicts a transformer stack 200 that includes a plurality of encoding layers that are coupled in sequence. Each encoding layer operates to receive an input and convert the input from a particular format to a different format. The inputs and the outputs vary depending on the capabilities and functionalities of each layer. For example, a layer may convert text into a vector, another layer may convert one or more features of an image or audio data into another vector, and so forth. In aspects, the transformer stack 200 may be implemented in a cascading manner such that an output of a particular encoding layer may serve as an input to another encoding layer, and so forth. For example, an output from the layer 202 may serve as an input to the layer 204, and the output of the layer 204 may serve as an input to the layer 206.

Further, as illustrated in FIG. 2A, each of layers 202-210 may include multiple vectors or elements. Each of the vectors may include a plurality of elements or numbers representative of various characteristics of the training data, e.g., elements may describe a sequence of sentences, letters, punctuations in sentences, and so forth. As described above, it is noted that prior to generating vectors corresponding to different sentences, each of the sentences are partitioned (e.g., tokenized) such that each sentence comprises a combination of one or words or phrases. Additionally, each partition or token may correspond to a combination of one or more words or phrases, and respective vectors may be generated for each partition or token. Elements may also describe various characteristics of audio data, video data, and so forth. Returning to FIG. 2A, layer 202 and layer 204 each include a plurality of elements. For example, the layer 202 may include one or more vectors comprising elements 224, 226, 228, 230, and 232 ($T_6$ to $T_{10}$), and the layer 204 may include one or more vectors comprising elements 214, 216, 218, 220, and 222 ($T_1$ to $T_5$). In aspects, one or more of the elements in the layer 202 may be combined with one or more elements in the layer 204, in the vector space, in order to generate variations of the training data, as described with respect to FIG. 1 above and FIGS. 3A and 3B below.

Figure 2B:
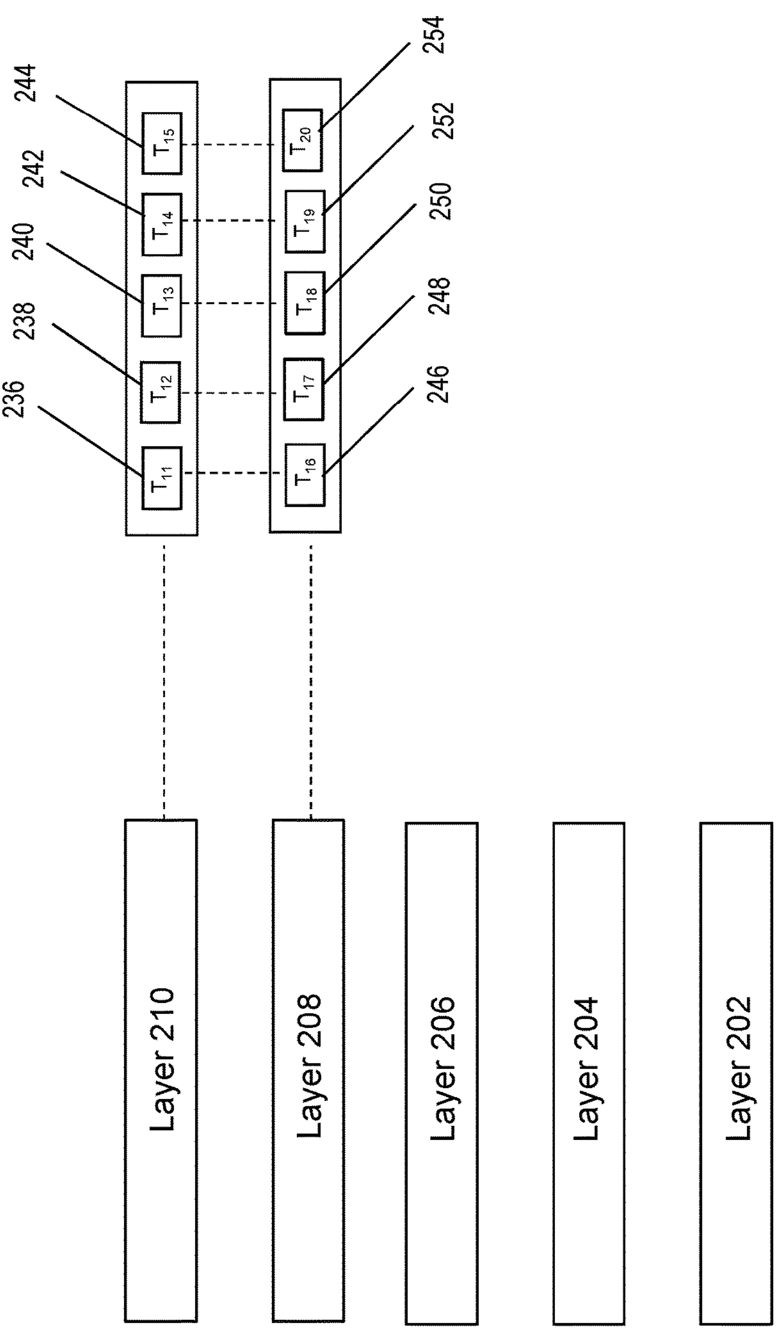
FIG. 2B depicts elements included as part of multiple layers, in accordance with some embodiments.

FIG. 2B depicts elements included as part of layer 208 and 210, in accordance with some embodiments. For example, the layer 210 may include one or more vectors comprising elements 236, 238, 240, 242, and 244 ($T_{11}$ to $T_{15}$), and the layer 208 may include one or more vectors comprising elements 246, 246, 250, 252, and 254 ($T_{16}$ to $T_{20}$). In aspects, similar to the elements in FIG. 2A, one or more of the elements in the layer 210 may be combined with one or more elements in the layer 208, in the vector space, in order to generate variations of the training data, as described with respect to FIG. 1 above and FIGS. 3A and 3B below.

As part of training of the model, given a sequence of elements of length N, an embedding or vector tensor may be generated and represented by the expression $\mathbb{R}^{N\times N\times E}$. In this expression, the term E represents a value corresponding to a dimension of the embedding or vector tensor and the term N corresponds to a length of the sequence of elments, e.g., a number of elements included as part of the vector. Further, the term "H" represents a head of the machine learning network. In aspects, during the training of the model, weighted combinations of adjacent layers, e.g., the layers 202 and 204 and the layers 206 and 208, may be determined, and a layer of the transformer stack 200, which includes one or more vectors (including various elements) may be combined with one or more additional vectors (including various additional elements) at another layer of the transformer stack 200. Thereafter, a linear combination of vectors at adjacent layers may be fed as input to another layer of the transformer stack 200. It is noted that, for each of the layers 202, 204, 206, 208, and 210, a random determination is made regarding whether a particular vector or embedding that is output from one layer is directly input into the subsequent layer or if a weighted combination with respect to the vector or embedding is determined prior to inputting the vector into another layer. The weighted combination that is determined has a probability value that ranges between 0 and 1, inclusive. Further, a weighting factor may also be determined and may have a value ranging from 0 to 1, inclusive. The weighting factor may be drawn from a uniform distribution and may be randomly determined.

In aspects, based on the determination of a weighted combination and a weighting factor, two vectors, namely one or more elements within these vectors, may be combined in the vector or embedding space. As stated above, such a combination in the vector space may result in the generation of a combined vector (e.g., a new vector) that includes the elements of both the individual vectors. For example, as stated above, vectors representing the two sentences of "Cats sit on couches" and "Dogs play regularly in yards" may be combined such that the combined vector may include elements representative of the sentence "Cats sit on couches Dogs play regularly in yards." Vectors of images, audio data, video data, and so forth, may be combined in a similar manner. The combined vector or embedding may be represented by the following expression:

$$\hat{e}_\ell^j = (1-\lambda)e_\ell^j + \lambda e_\ell^j - 1 \quad (1)$$

It is noted that the use of the drop-layer based technique may involve designating the weighting factor to be 1.0 and the weight factor 0.5 may correspond to a mean or average embedding between adjacent layers. In short, it is noted that training data is varied in the vector or embedding space by determining the specific layers at which vector are to be merged (e.g., using a weighing combination that ranges from a value of 0 to 1) and the weighting factor (which ranges from 0 to 1) to determine the blending or combination of vectors.

Figure 3A:
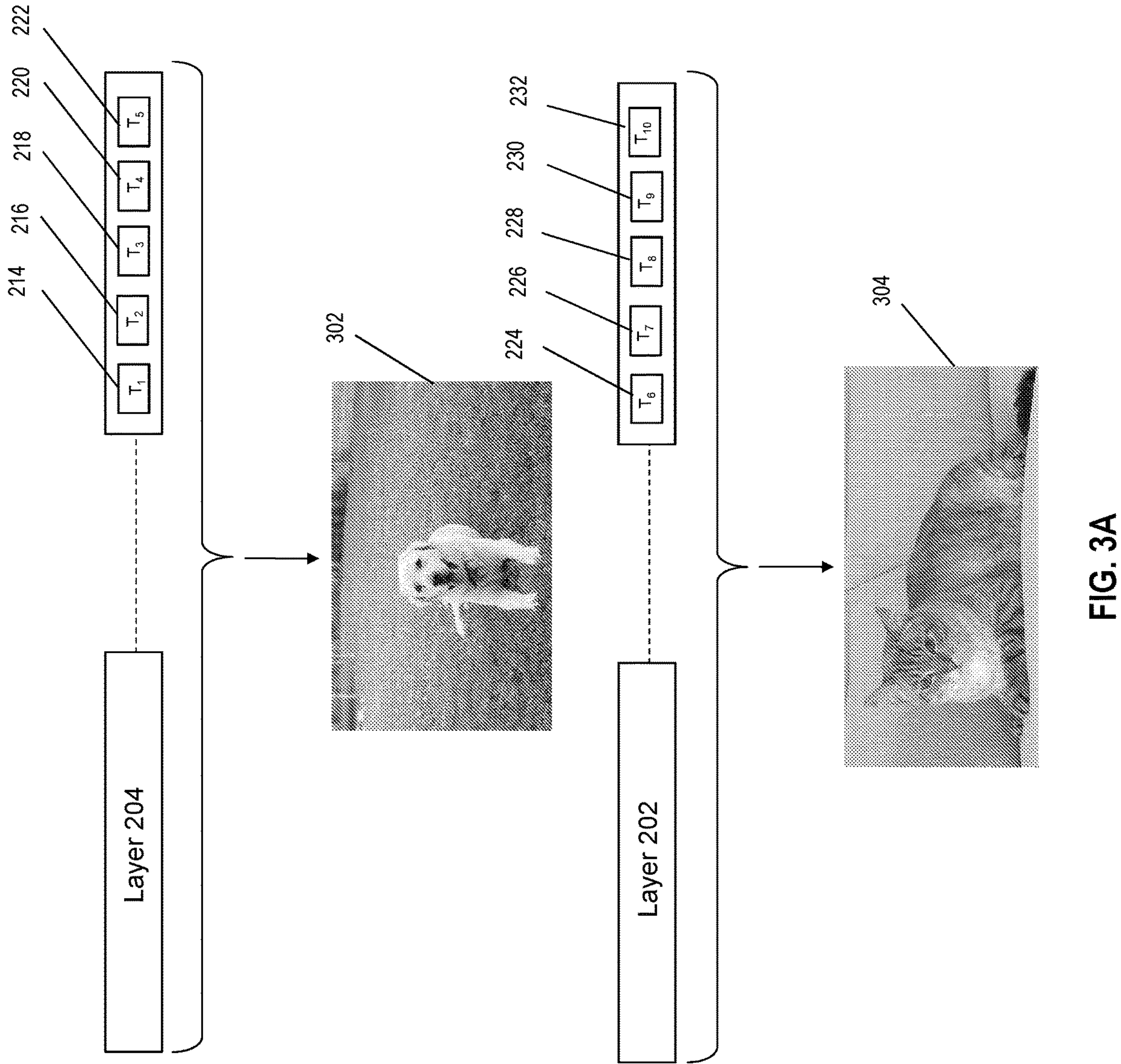
FIG. 3A depicts an alternative example in which various layers include vectors with elements corresponding to certain characteristics of two separate and distinct images.

FIG. 3A depicts an alternative example in which the layers 204 and 202 include vectors with elements corresponding to particular characteristics of two separate and distinct images, e.g., images 302 and 304. In, as illustrated in FIG. 3A, an example vector at the layer 204 includes elements 214, 216, 218, 220, and 222 ($T_1$ to $T_5$) that are representative of various characteristics of the image 302—a dog in a backyard, and another example vector at the layer 202 includes elements 224, 226, 228, 230, and 232 (Elements $T_6$ to $T_{10}$) that are representative of various characteristics of the image 304—a cat sitting on a couch. In aspects, the elements 214-220 and 224-232 may be associated with vectors in each of the layers 202 and 204, which may correspond to the initial layers of the training of the machine learning model. In aspects, these initial layers, namely the elements of vectors in these initial layers may characterize colors, textures, and so forth, associated with the image 302 and the image 304. For example, these elements may characterize black eyes of the cat, white fur of the dog, green grass, a beige couch, and so forth. As such, combining one or more of these elements at the layers 202 and 204 may correspond to fusing or concatenating the elements representative of the black eyes of the cat (among other colors and textures), with the white fur of the dog, the green grass, and so forth.

Figure 3B:
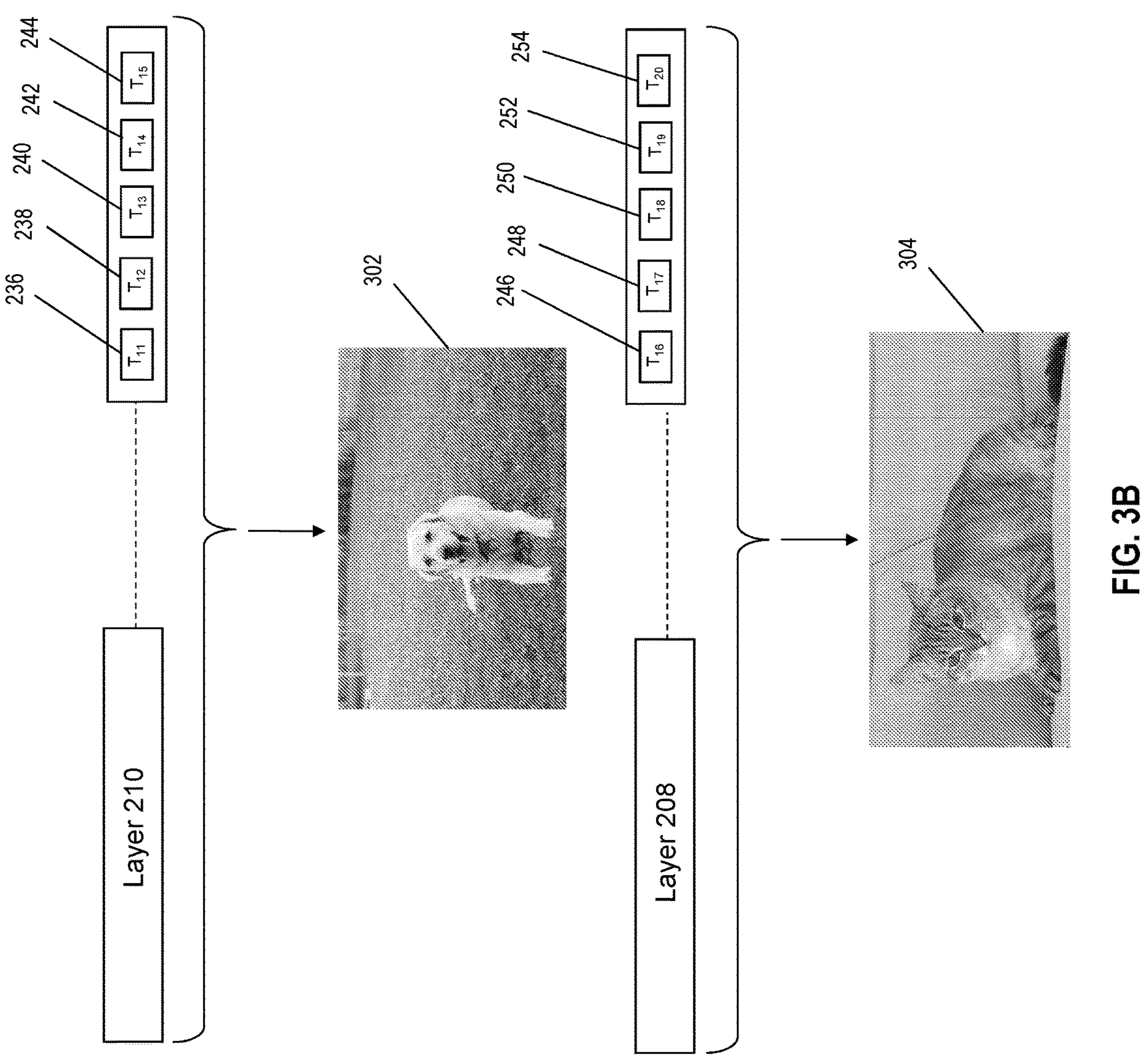
FIG. 3B depicts another alternative example in which various layers include vectors with elements corresponding to characteristics of two distinct images that are associated with a category that is different from the category of elements described in FIG. 3A.

FIG. 3B depicts another alternative example in which the layers 210 and 208 include vectors with elements corresponding to characteristics of the images 302 and 304 that are associated with a category that is different from the category of elements described with respect to FIG. 3A. In particular, the elements 236-244 ($T_{11}$-$T_{15}$) at the layer 210 and the elements 246-254 ($T_{16}$-$T_{20}$), unlike elements 214-222 and 224-232, may describe entire objects in the images 302 and 304 such as the dog in the foreground of the image 302 and the cat in the foreground of the image 304. Further, the elements 236-244 and 246-254 may also describe the green grass in the background of the image 302 and the beige couch in the background of the image 304. In aspects, these elements may be included as part of later layers that capture subtle or fine details in the images 302, 304, namely the layers 208 and 210. Broadly speaking, initial layers have a particular amount of information related to images, videos, and so forth, such as colors, textures, and etc., while later layers may include the information present in the initial layers and finer or subtler details, such as objects, actions, object pose information, and so forth. In short, later layers include information of images, videos, and so forth, corresponding to a higher level of detail, while initial layers include a lesser amount of detail relative to the later layers.

As such, combining one or more of the elements 236-244 with the elements 246-254 may correspond to fusing or combining the elements representative of the cat with the elements representing the green grass background and fusing or combining the elements representative of the dog with the element representative of the beige couch background. In this way, models may be trained to more accurately identify a large range of images based on a relatively smaller training dataset, namely by generating self-contrastive vector pairs corresponding to significant variations of a particular set of images in the training dataset.

Figure 4:
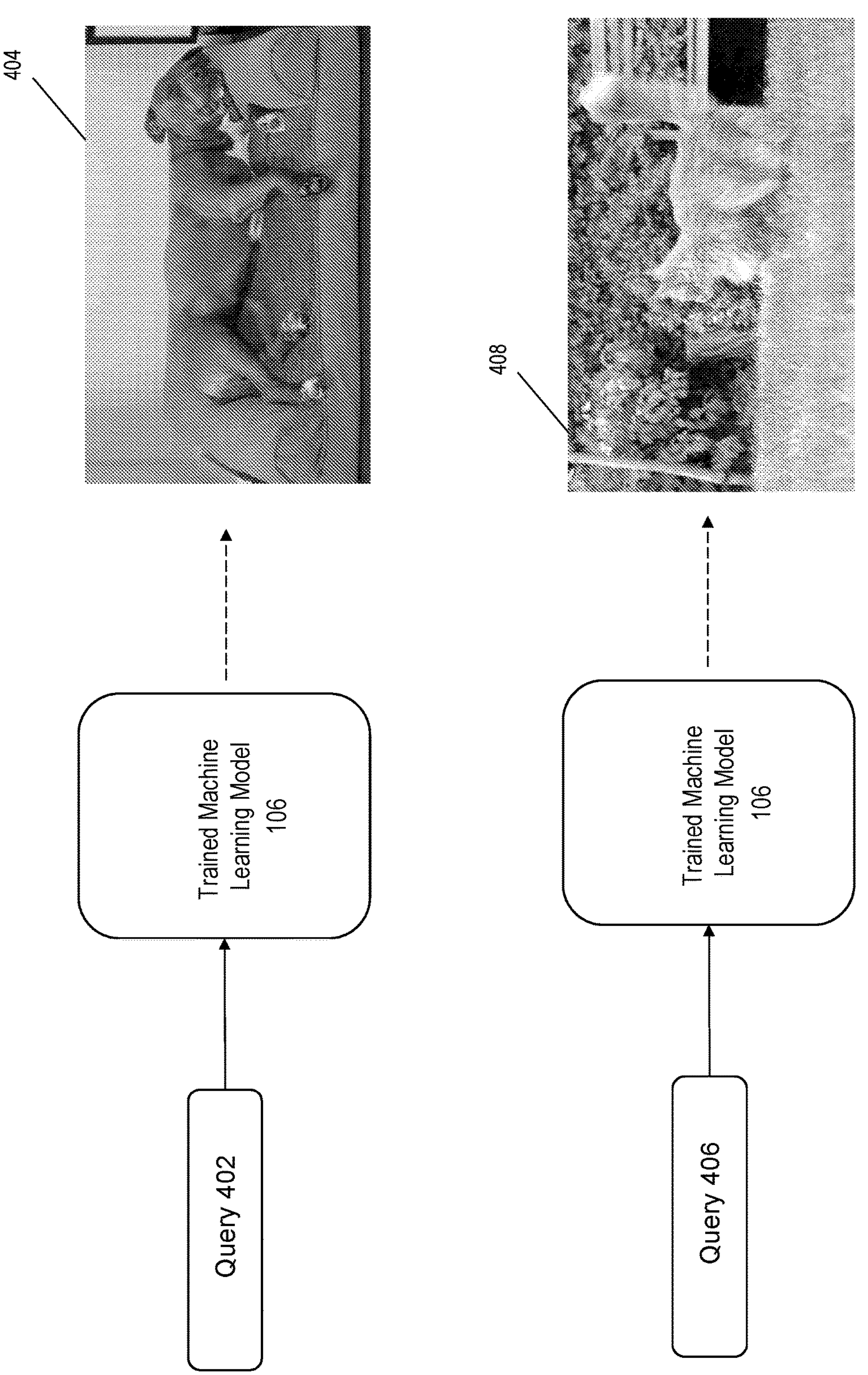
FIG. 4 depicts an implementation of the trained machine learning model, in accordance with some embodiments.

FIG. 4 depicts an implementation of the trained machine learning model 106, in accordance with some embodiments. In particular, the trained machine learning model 106 may receive a query 402 for identifying an image in which a dog is sleeping on a couch and the trained machine learning model 106, subsequent to and based on the training processes and examples described in FIGS. 2A-3B, may identify an image 404, which includes a dog sleeping on the couch. It is noted that while there was no explicit image of a dog anywhere near a couch in the training data upon which the trained machine learning model 106 may have been trained, the trained machine learning model 106 may nonetheless accurately identify the image 404 in response to the query 402. Similarly, the trained machine learning model 106 may receive a query 406 for the identification of a cat playing in the yard and identify an image 408, in which a cat is depicted in the yard.

Figure 5:
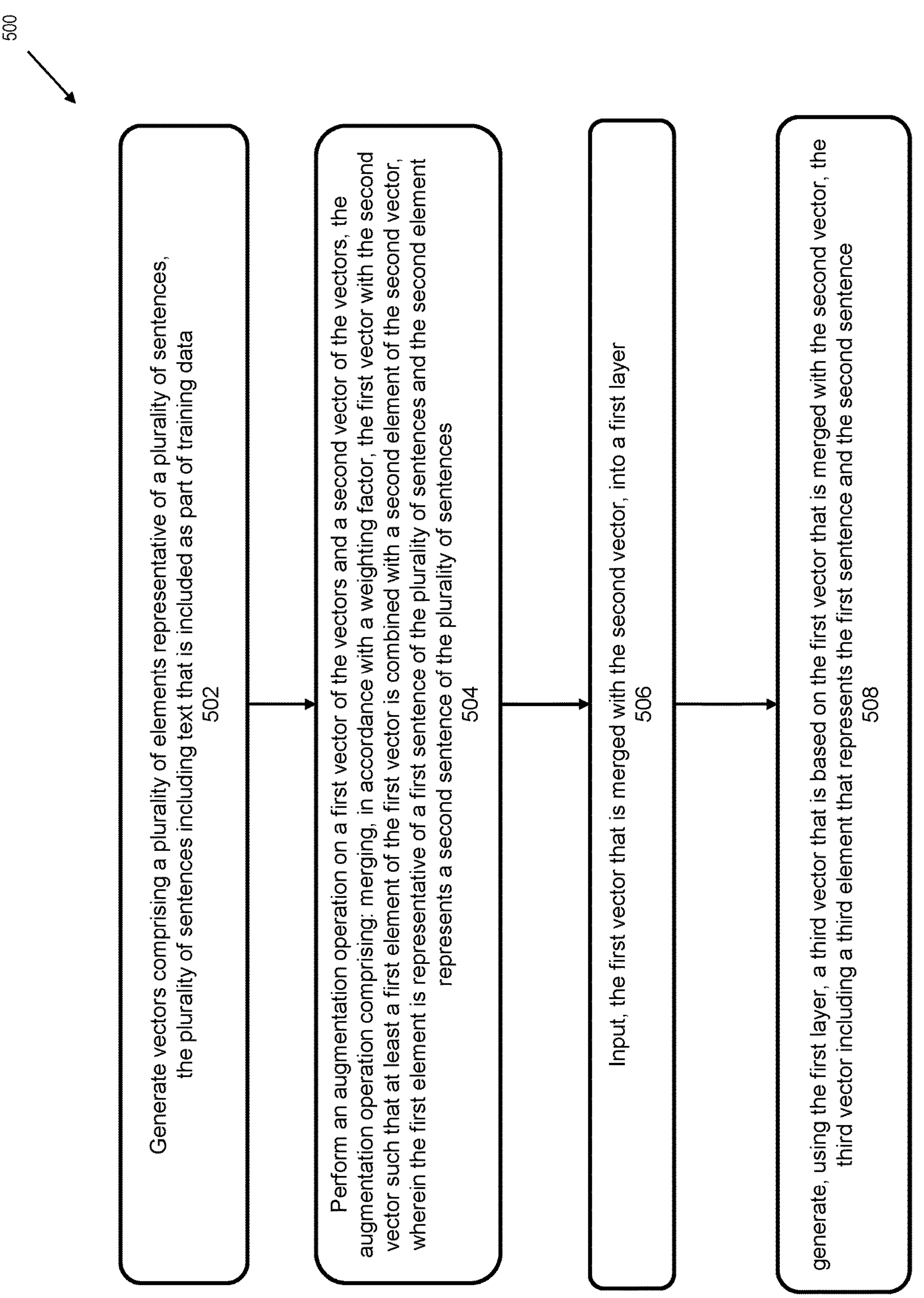
FIG. 5 depicts a flow diagram for implementing the trained machine learning model that is trained on drop-layer based vector augmentation, in accordance with some embodiments.

FIG. 5 depicts a flow diagram 500 for implementing the trained machine learning model that is trained on drop-layer based vector augmentation, in accordance with some embodiments; and.

At block 502, vectors comprising a plurality of elements representative of a plurality of sentences are generated. The plurality of sentences include text that included as part of a training data set. It is noted that, as described above, the plurality of elements may be represented in the form of numbers that characterize various aspects of the text of the sentences. In aspects, elements may correspond to a sequence of one or more letters, words, sentences, and so forth. In aspects, the training data may include image data, video, and so forth. As such, the elements may be representative of color, texture, objects, and so forth, present in the images, video, and so forth.

At block 504, an augmentation operation may be performed on a first vector of the vectors and a second vector of the vectors. The augmentation operation comprises merging, in accordance with a weighting factor, the first vector with the second vector such that at least a first element of the first vector is combined with a second element of the second vector. It is noted that the first element is representative of a first sentence and a second element is representative of a second sentence. As described above with respect to FIG. 1, a result of the augmentation operation, in the vector space, may result in the generation of a combination of a first sentence (e.g., "Cats sit on couches") and a second sentence (e.g., "Dogs play regularly in yards") such that the combined vector may correspond to a sentence of ("Cats sit on couches Dogs play regularly in yards").

At block 506, the combined first vector and second vector as described in 504 may be input into a first layer.

At block 508, a third vector that is based on the first vector that is merged with the second vector may be generated in the form of an output from the first layer. The third vector may including at least a third element that represents the first sentence and the second sentence. As stated above, the third element may correspond to a combination of the first element and the second element, e.g., "Cats sit on couches Dogs play regularly in yards".

Figure 6:
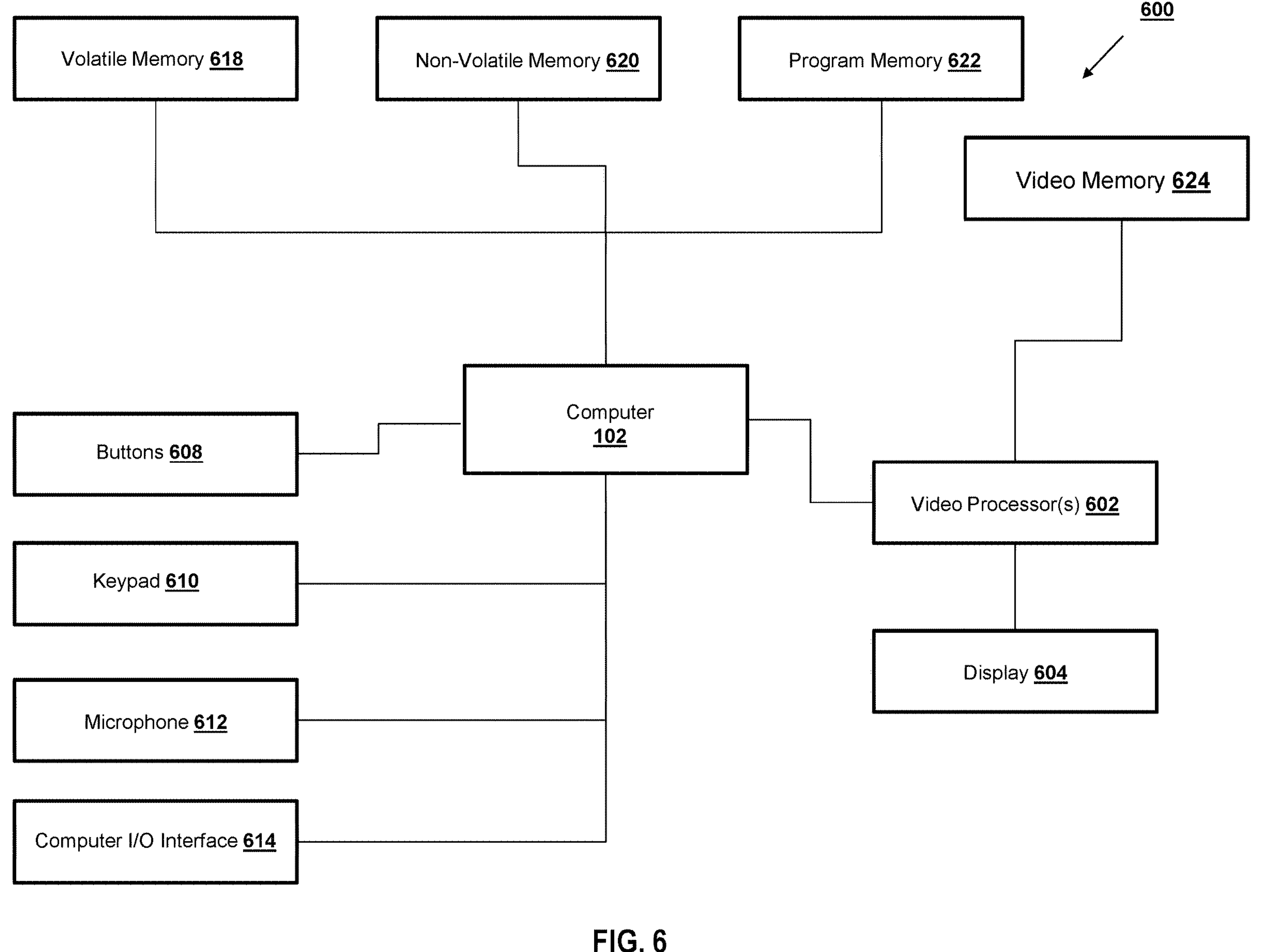
FIG. 6 depicts a computing system that may implement the trained machine learning model, according to some embodiments, in accordance with some embodiments.

FIG. 6 depicts a computing system 600 that may implement the trained machine learning model 106, according to some embodiments, in accordance with some embodiments. The computing system may include the computer 102 that is communicatively coupled (wired or wirelessly coupled) to a display 604, a keypad 610 (e.g., a keyboard) one or more sensors implanted in the brain of a patient, and one or more brain machine interfaces that are external to the computer 102. The computer 102 may also include video processors 602, buttons 608, a microphone 612, a computer input/output interface 614, memory in the form of volatile memory 618, non-volatile memory 620, and program memory 622.

The video processors 602 can provide/receive commands, status information, streaming video, still video images, and graphical overlays to/from the computer 102 and may be comprised of FPGAs, DSPs, or other processing elements which provide functions such as image capture, image enhancement, graphical overlay merging, distortion correction, frame averaging, scaling, digital zooming, overlaying, merging, flipping, motion detection, and video format conversion and compression.

The computer 102 can be used to manage the user interface by receiving input via buttons 608, keypad 610, and/or microphone 612, in addition to providing a host of other functions, including image, video, and audio storage and recall functions, system control, and measurement processing. The buttons 608 and/or keypad 610 also can be used for menu selection and providing user commands to the server 110 (e.g., freezing or saving a still image).

The video processors 602 can also communicate with video memory 624, which is used by the video processors 602 for frame buffering and temporary holding of data during processing. The computer 102 can also communicate with program memory 522 for storage of programs executed by the computer 102. In addition, the server 110 can be in communication with the volatile memory 618 (e.g., RAM), and the non-volatile memory 620 (e.g., flash memory device, a hard drive, a DVD, or an EPROM memory device). The non-volatile memory 620 is the primary storage for streaming video and still images.

The computer 102 can also be in communication with a computer input/output interface 514, which provides various interfaces to peripheral devices and networks, such as USB, Firewire, Ethernet, audio I/O, and wireless transceivers. This computer input/output interface 614 can be used to save, recall, transmit, and/or receive still images, streaming video, or audio. For example, a USB "thumb drive" or CompactFlash memory card can be plugged into computer input/output interface 614. In addition, the computing system 600 can be configured to send frames of image data or streaming video data to an external computer or server. The computing system 600 can incorporate a TCP/IP communication protocol suite and can be incorporated in a wide area network including a plurality of local and remote computers, each of the computers also incorporating a TCP/IP communication protocol suite.

Further non-limiting aspects or embodiments are set forth in the following numbered examples:

Example 1: A computer-implemented method comprising: generating vectors comprising a plurality of elements representative of a plurality of sentences, the plurality of sentences including text that is included as part of training data, performing an augmentation operation on a first vector of the vectors and a second vector of the vectors, the augmentation operation comprising: merging, in accordance with a weighting factor, the first vector with the second vector such that at least a first element of the first vector is combined with a second element of the second vector, wherein the first element is representative of a first sentence of the plurality of sentences and the second element represents a second sentence of the plurality of sentences, inputting, the first vector that is merged with the second vector, into a first layer, and generating, using the first layer, a third vector that is based on the first vector that is merged with the second vector, the third vector including a third element that represents the first sentence and the second sentence.

Example 2: The computer-implemented method of example 1, wherein the merging of the first vector with the second vector includes concatenating the first element representative of the first sentence with the second element representative of the second sentence.

Example 3: The computer-implemented method of example 1 or 2, wherein the first element comprises a first plurality of numbers representative of one or more letters of the first sentence and the second element comprises a second plurality of numbers representative of one or more letters of the second sentence.

Example 4: The computer-implemented method of any one of examples 1-3, wherein the third element includes a third plurality of numbers that comprises the first plurality of numbers and the second plurality of numbers.

Example 5: The computer-implemented method of any of examples 1-4, wherein the weighting factor is randomly determined.

Example 6: The computer-implemented method of any one of examples 1-5, wherein the weighting factor has a value in a range between 0 and 1.

Example 7: The computer-implemented method of any one of examples 1-6, further comprising generating additional vectors comprising a plurality of additional elements representative of a plurality of images included as part of the training data, performing an additional augmentation operation on a fourth vector of the additional vectors and a fifth vector of the additional vectors, the augmentation operation comprising: merging, in accordance with an additional weighting factor, the fourth vector with the fifth vector such that a fourth element of the fourth vector is combined with a fifth element of the fifth vector, wherein the fourth element represents a first characteristic of an image of the plurality of images and the fifth element represents a second characteristic of an additional image, inputting, the fourth vector that is merged with the fifth vector, into a second layer, and generating, using the second layer, a sixth vector that is based on the fourth vector that is merged with the fifth vector, the sixth vector including a sixth element that represents the first characteristic of the image and the second characteristic of the additional image.

Example 8: The computer-implemented method of any one of examples 1-7, wherein the weighting factor has a value in a range between 0 and 1.

Example 9: The computer-implemented method of any one of examples 1-8, wherein the first characteristic corresponds to a color of the image and the second characteristic corresponds to an additional color in the additional image, and wherein the fourth element comprises numbers representing the color and the fifth element comprises additional numbers representing the additional color.

Example 10: The computer-implemented method of any one of examples 1-9, wherein the sixth element includes the first characteristic and the second characteristic, the sixth element comprises the numbers representing the color and the additional numbers representing the additional color.

Example 11: A system that comprises at least one data processor, and at least one memory storing instructions, which when executed by the at least one data processor, cause operations comprising: generating vectors comprising a plurality of elements representative of a plurality of sentences, the plurality of sentences including text that is included as part of training data, performing an augmentation operation on a first vector of the vectors and a second vector of the vectors, the augmentation operation comprising: merging, in accordance with a weighting factor, the first vector with the second vector such that at least a first element of the first vector is combined with a second element of the second vector, wherein the first element is representative of a first sentence of the plurality of sentences and the second element represents a second sentence of the plurality of sentences, inputting, the first vector that is merged with the second vector, into a first layer, and generating, using the first layer, a third vector that is based on the first vector that is merged with the second vector, the third vector including a third element that represents the first sentence and the second sentence.

Example 12: The system of example 11, wherein the merging of the first vector with the second vector includes concatenating the first element representative of the first sentence with the second element representative of the second sentence.

Example 13: The system of example 11 or example 12, wherein the first element comprises a first plurality of numbers representative of one or more letters of the first sentence and the second element comprises a second plurality of numbers representative of one or more letters of the second sentence.

Example 14: The system of any of examples 11-13, wherein the third element includes a third plurality of numbers that comprises the first plurality of numbers and the second plurality of numbers.

Example 15: The system of any of examples 11-14, wherein the weighting factor has a value in a range between 0 and 1.

Example 16: The system of any of examples 11-15, wherein the operations further comprise: generating additional vectors comprising a plurality of additional elements representative of a plurality of images included as part of the training data, performing an additional augmentation operation on a fourth vector of the additional vectors and a fifth vector of the additional vectors, the augmentation operation comprising: merging, in accordance with an additional weighting factor, the fourth vector with the fifth vector such that a fourth element of the fourth vector is combined with a fifth element of the fifth vector, wherein the fourth element represents a first characteristic of an image of the plurality of images and the fifth element represents a second characteristic of an additional image, inputting, the fourth vector that is merged with the fifth vector, into a second layer, and generating, using the second layer, a sixth vector that is based on the fourth vector that is merged with the fifth vector, the sixth vector including a sixth element that represents the first characteristic of the image and the second characteristic of the additional image.

Example 17: The system of any of examples 11-16, wherein the weighting factor has a value in a range between 0 and 1.

Example 18: The system of any of examples 11-17, wherein: the first characteristic corresponds to a color of the image and the second characteristic corresponds to an additional color in the additional image, and wherein the fourth element comprises numbers representing the color and the fifth element comprises additional numbers representing the additional color.

Example 19: The system of any of examples 11-18, wherein the sixth element includes the first characteristic and the second characteristic, the sixth element comprises the numbers representing the color and the additional numbers representing the additional color.

Example 20: At least one non-transitory computer readable media storing instructions that, when executed by at least one processor, cause the at least one processor to perform operations comprising: generating vectors comprising a plurality of elements representative of a plurality of sentences, the plurality of sentences including text that is included as part of training data; performing an augmentation operation on a first vector of the vectors and a second vector of the vectors, the augmentation operation comprising: merging, in accordance with a weighting factor, the first vector with the second vector such that at least a first element of the first vector is combined with a second element of the second vector, wherein the first element is representative of a first sentence of the plurality of sentences and the second element represents a second sentence of the plurality of sentences, inputting, the first vector that is merged with the second vector, into a first layer, and generating, using the first layer, a third vector that is based on the first vector that is merged with the second vector, the third vector including a third element that represents the first sentence and the second sentence.

What is claimed is:

1. A computer-implemented method for training a machine learning model, comprising:

generating vectors comprising a plurality of tokens representative of a plurality of sentences, the plurality of sentences including text that is included as part of training data;

performing an augmentation operation on a first vector of the vectors and a second vector of the vectors, the augmentation operation comprising:

merging, in accordance with a weighting factor, the first vector with the second vector such that at least a first token of the first vector is combined with a second token of the second vector, wherein the first token is representative of a first sentence of the plurality of sentences and the second token represents a second sentence of the plurality of sentences;

inputting, the first vector that is merged with the second vector, into a first encoding layer in a transformer stack, the first encoding layer being configured to receive a vector as input and convert the vector into a vector with a different format;

outputting, by the first encoding layer, a third vector that is based on the first vector that is merged with the second vector, the third vector including a third token that includes a combination of the first sentence and the second sentence; and generating a modified version of the training data comprising the third vector for training the machine learning model.

2. The computer-implemented method of claim 1, wherein the merging of the first vector with the second vector includes concatenating the first token representative of the first sentence with the second token.

3. The computer-implemented method of claim 2, wherein the first token comprises a first plurality of numbers representative of one or more letters of the first sentence and the second token comprises a second plurality of numbers representative of one or more letters of the second sentence.

4. The computer-implemented method of claim 3, wherein the third token includes a third plurality of numbers that comprises the first plurality of numbers and the second plurality of numbers.

5. The computer-implemented method of claim 1, further comprising determining the weighting factor randomly.

6. The computer-implemented method of claim 5, wherein the weighting factor has a value in a range between 0 and 1.

7. The computer-implemented method of claim 1, further comprising:

generating additional vectors comprising a plurality of additional tokens representative of a plurality of images included as part of the training data;

performing an additional augmentation operation on a fourth vector of the additional vectors and a fifth vector of the additional vectors, the augmentation operation comprising:

merging, in accordance with an additional weighting factor, the fourth vector with the fifth vector such that a fourth token of the fourth vector is combined with a fifth token of the fifth vector, wherein the fourth token represents a first characteristic of an image of the plurality of images and the fifth token represents a second characteristic of an additional image, inputting, the fourth vector that is merged with the fifth vector, into a second encoding layer in the transformer stack; and outputting, by the second layer, a sixth vector that is based on the fourth vector that is merged with the fifth vector, the sixth vector including a sixth token that represents the first characteristic of the image and the second characteristic of the additional image.

8. The method of claim 7, wherein the weighting factor has a value in a range between 0 and 1.

9. The method of claim 7, wherein:

the first characteristic corresponds to a color of the image and the second characteristic corresponds to an additional color in the additional image, and wherein the fourth token comprises numbers representing the color and the fifth token comprises additional numbers representing the additional color.

10. The method of claim 9, wherein the sixth token includes the first characteristic and the second characteristic, the sixth token comprises the numbers representing the color and the additional numbers representing the additional color.

11. A system comprising:

at least one data processor; and at least one memory storing instructions, which when executed by the at least one data processor, cause operations comprising:

generating vectors comprising a plurality of tokens representative of a plurality of sentences, the plurality of sentences including text that is included as part of training data;

performing an augmentation operation on a first vector of the vectors and a second vector of the vectors, the augmentation operation comprising:

merging, in accordance with a weighting factor, the first vector with the second vector such that at least a first token of the first vector is combined with a second token of the second vector, wherein the first token is representative of a first sentence of the plurality of sentences and the second token represents a second sentence of the plurality of sentences;

inputting, the first vector that is merged with the second vector, into a first encoding layer in a transformer stack, the first encoding layer being configured to receive a vector as input and convert the vector into a vector with a different format;

outputting, by the first encoding layer, a third vector that is based on the first vector that is merged with the second vector, the third vector including a third token that includes a combination of the first sentence and the second sentence; and generating a modified version of the training data comprising the third vector for training a machine learning model.

12. The system of claim 11, wherein the merging of the first vector with the second vector includes concatenating the first token representative of the first sentence with the second token.

13. The system of claim 12, wherein the first token comprises a first plurality of numbers representative of one or more letters of the first sentence and the second token comprises a second plurality of numbers representative of one or more letters of the second sentence.

14. The system of claim 13, wherein the third token includes a third plurality of numbers that comprises the first plurality of numbers and the second plurality of numbers.

15. The system of claim 11, wherein the weighting factor has a value in a range between 0 and 1.

16. The system of claim 11, wherein the operations further comprise:

generating additional vectors comprising a plurality of additional tokens representative of a plurality of images included as part of the training data;

performing an additional augmentation operation on a fourth vector of the additional vectors and a fifth vector of the additional vectors, the augmentation operation comprising:

merging, in accordance with an additional weighting factor, the fourth vector with the fifth vector such that a fourth token of the fourth vector is combined with a fifth token of the fifth vector, wherein the fourth token represents a first characteristic of an image of the plurality of images and the fifth token represents a second characteristic of an additional image, inputting, the fourth vector that is merged with the fifth vector, into a second encoding layer in the transformer stack; and outputting, by the second encoding layer, a sixth vector that is based on the fourth vector that is merged with the fifth vector, the sixth vector including a sixth token that represents the first characteristic of the image and the second characteristic of the additional image.

17. The system of claim 16, wherein the weighting factor has a value in a range between 0 and 1.

18. The system of claim 16, wherein:

the first characteristic corresponds to a color of the image and the second characteristic corresponds to an additional color in the additional image, and wherein the fourth token comprises numbers representing the color and the fifth token comprises additional numbers representing the additional color.

19. The system of claim 18, wherein the sixth token includes the first characteristic and the second characteristic, the sixth token comprises the numbers representing the color and the additional numbers representing the additional color.

20. At least one non-transitory computer readable media storing instructions that, when executed by at least one processor, cause the at least one processor to perform operations comprising:

generating vectors comprising a plurality of tokens representative of a plurality of sentences, the plurality of sentences including text that is included as part of training data;

performing an augmentation operation on a first vector of the vectors and a second vector of the vectors, the augmentation operation comprising:

merging, in accordance with a weighting factor, the first vector with the second vector such that at least a first token of the first vector is combined with a second token of the second vector, wherein the first token is representative of a first sentence of the plurality of sentences and the second token represents a second sentence of the plurality of sentences;

inputting, the first vector that is merged with the second vector, into a first encoding layer in a transformer stack, the first encoding layer being configured to receive a vector as input and convert the vector into a vector with a different format;

outputting, by the first encoding layer, a third vector that is based on the first vector that is merged with the second vector, the third vector including a third token that includes a combination of the first sentence and the second sentence; and generating a modified version of the training data comprising the third vector for training the machine learning model.

* * * * *